Patented July 11, 1950

2,514,895

UNITED STATES PATENT OFFICE 2,514,895

ALKYL ALLYLOXYALKYL MALEATES

Harry T. Neher, Bristol, Edwin H. Kroeker, Cheltenham, and Willard J. Croxall, Bryn Athyn, Pa., assignors to Rohm & Haas Company, Philadelphia, Pa., a corporation of Delaware No Drawing. Application August 20, 1947, Serial No. 769,759

9 Claims. (Cl. 260—78.5)

This invention deals with polymerizable esters of the formula:

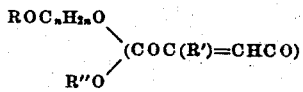

and with copolymers prepared therefrom in conjunction with polymerizable vinylidene compounds which are compatible therewith. In the above formula, R represents an allyl group, $CH_2=CHCH_2-$, R' represents hydrogen, halogen, or a methyl group, R" represents an alkyl group, particularly a lower alkyl group, including such alkyl groups as methyl, ethyl, propyl, butyl, hexyl, or octyl, and $C_nH_{2n}$ represents an alkylene radical of two to three carbon atoms.

The simple esters, diallyl maleate and dimethallyl maleate, which are already known, polymerize with such vigor that even in the preparation of copolymers therefrom in conjunction with other unsaturated compounds it is not possible to control the polymerization reaction. Polymers and copolymers based on these simple esters, as a consequence, contain cracks or strains which defeat their effective utilization.

It has now been found that the several groups to which polymerizing properties are due may be utilized in esters of the structure given above in which an allyl group is separated from the $\alpha,\beta$-unsaturated acid nucleus by an ether group.

The acid nucleus may be based on maleic, fumaric, chloromaleic, bromomaleic, or citraconic acids. These acids may themselves be used as starting materials or, in the cases where their anhydrides are available, the latter may be used.

The $\alpha,\beta$-carboxylic acid or its anhydride is esterified with a saturated aliphatic alcohol and with an allyloxyethanol or allyloxypropanol. The order in which these two types of alcohols are used is not critical.

In general, the esters of this invention are prepared by forming a half ester with one of the above types of alcohols and an $\alpha,\beta$-unsaturated carboxylic acid or its anhydride and reacting the half ester with the other type of alcohol. The diester thus formed may be purified by conventional methods. Since esters having relatively high molecular weights tend to polymerize at temperatures required for distillation, it is desirable to use polymerization inhibitors, such as hydroquinone or $\alpha$- or $\beta$-naphthol, when purification is accomplished by distillation.

The monomers are readily polymerized with peroxide catalysts to give hard solids, but the real utility of the new esters is in conjunction with polymerizable unsaturated compounds having a single ethylenic linkage, the $CH_2=C<$ group, in the preparation of copolymers therewith. To these combinations with polymerizable compounds having a terminal pair of olefinically bonded carbon atoms the alkyl allyloxyalkyl maleates impart valuable properties of hardness and abrasion resistance, yet without excessive brittleness. Whereas polymers of the pure alkyl allyloxyalkyl maleates do not yield sound, useful castings, the copolymers yield good castings with many good properties.

The preponderant proportion of the copolymers consists of one or more of the esters of this invention. Preferably, 60% to 90% of the copolymer is derived therefrom, and the polymerizable vinylidene compound forms 40% to 10% of the copolymer.

As polymerizable vinylidene compound, there may be used styrene, vinyl chloride, vinyl acetate, vinyl isobutyl ether, methyl methacrylate, butyl methacrylate, methyl acrylate, ethyl acrylate, butyl acrylate, or any other polymerizable olefinic compound which is miscible with the maleates of this invention.

To form the copolymer, the maleates of this invention and one or more compounds having a terminal pair of olefinically bonded carbon atoms are mixed, a catalyst added, and the resulting mixture heated. Temperatures of 30° C. to 135° C. are generally suitable.

The following examples are illustrative of methods of preparation of the esters of this invention:

Example 1

A mixture of 196 parts of maleic anhydride, 202 parts of allyloxyethanol, and three parts of $\beta$-naphthol was placed in a vessel equipped with stirrer, condenser, and water separator. The mixture was heated at 90° to 110° C. for three hours to form the half ester. Thereupon, there were added 200 parts of ethylene dichloride, 163 parts of n-butyl alcohol, and four parts of sulfuric acid to form a reaction mixture which was heated under reflux with removal of water of esterification by azeotropic distillation and separation of the water in the trap provided therefor. When water was no longer evolved, the reaction mixture was washed with concentrated soda solution, and with water, and then dried over sodium sulfate. The reaction product was separated by fractional distillation at reduced pressure. The fraction of 154 parts collected at 142°–144° C./3 mm. was almost pure butyl allyloxyethyl maleate.

In place of the alloxyethanol, there may be used an equivalent weight of alloxypropanol. The ester formed is similar in its properties to that from alloxyethanol, except for a higher boiling range.

Example 2

A mixture of 196 parts of maleic anhydride and 64 parts of methanol was heated at 90° C. for a half hour to form the half methyl ester. Thereupon, 204 parts of allyloxyethanol was added together with 200 parts of benzene, two parts of β-naphthol, and four parts of sulfuric acid. The reaction mixture was heated under reflux with removal of water by means of a trap. When water was no longer evolved, the mixture was washed with soda ash solution, dried, and fractionated. The fraction obtained at 110°–112° C./1 mm. was identified as practically pure

CH₃OCOCH=CHCOOCH₂—CH₂OCH₂CH=CH₂

By methods substantially the same, there may be prepared esters of chloromaleic or bromo-maleic acid. The esterification may also be carried out with citraconic acid or fumaric acid and the alkyl allyloxyethyl or allyloxypropyl esters prepared therefrom. Any of these esters may be similarly used in the preparation of copolymers, although the unsubstituted maleates or fumarates are preferred.

As catalysts for polymerization, there may be used from about 0.1% to 5% of an organic peroxide, such as benzoyl peroxide, lauroyl peroxide, tert.-butyl hydroperoxide, or the like.

Typical preparation of copolymers are shown in the following examples in which parts are by weight:

Example 3

There were mixed 67 parts of allyloxyethyl methyl maleate and 33 parts of methyl methacrylate. Thereto was added 0.7 part of benzoyl peroxide, which was stirred therewith until dissolved. The mixture was then poured into a glass mold, which was placed in an oven at 66° C., where it was left for forty hours. The mold was then heated at 130° C. for two hours, whereupon the mold was stripped from the copolymer which had formed. A crack-free sheet of good abrasion resistance was thus obtained.

Example 4

A mixture was prepared from 75 parts of alloxyethyl butyl maleate, 25 parts of methyl methacrylate, and 1.4 parts of a catalyst made from equal weights of benzoyl peroxide and tert.-butyl perbenzoate. The mixture was poured into a glass mold, which was then heated for sixteen hours at 70° C. and for one hour at 125° C. The mold was stripped from the cast sheet at room temperature. The sheet obtained was hard, crack-free, and resistant to abrasion.

In place of the allyloxyethyl methyl maleate or allyloxyethyl butyl maleate of the examples, there may be used in the same way the corresponding allyloxypropyl esters with practically the same result, the copolymers obtained being characterized by marked hardness and resistance to abrasion. Introduction of the 2-ethylbutyl or 2-ethylhexyl groups in place of the methyl or butyl groups shown above gives copolymers which, even though not so hard as the polymers shown above, are still characterized by a favorable degree of hardness and marked resistance to abrasion, whether measured by a falling sand method or a wiping test.

Instead of the maleates used above as illustrative of the methods here involved, there may be prepared similar esters of fumaric acid, chloromaleic acid, or the methyl analogues. Chloromaleic anhydride may be substituted in equivalent amount for the maleic anhydride used above. The esters, whether containing a methyl, ethyl, butyl, or octyl group, can be controlled in polymerization and give copolymers which are hard and abrasion-resistant.

In place of methyl methacrylate as the vinylidene compound used for copolymerization, there may be used any of the other compounds having a terminal pair of olefinically bonded carbon atoms indicated above or mixtures of the various vinylidene compounds to give valuable new products. Typical copolymers are illustrated below.

Example 5

A mixture was made from seventy-five parts of allyloxyethyl methyl maleate and twenty-five parts of butyl methacrylate. Thereto was added one part of benzoyl peroxide. The mixture was placed in a glass mold, which was then placed in an oven heated at 70° C., where it was left overnight. The temperature was then gradually raised to 130° C. There was thus obtained a relatively hard, tough, abrasion-resistant casting.

Example 6

A mixture was prepared from sixty parts of allyloxyethyl methyl maleate, thirty parts of methyl methacrylate, and ten parts of ethyl acrylate and treated with 1.1% by weight of tert.-butyl perbenzoate. The mixture was placed in a glass mold, which was then heated for twenty-four hours at 65° C. and for three hours at 125° C. The casting was coherent and hard.

Example 7

A mixture was made from eighty parts of allyloxyethyl methyl maleate and twenty parts of vinyl acetate, and there was added a mixture of one-half part of tert.-butyl perbenzoate and one-half part of acetyl peroxide. The mixture was heated at 65°–70° C. for twenty-four hours and then at 120° C. for about two hours. A tough, abrasion-resistant casting was obtained.

Other polymerizable vinylidene compounds may replace the acrylic or vinyl esters used above, and these may be supplemented with such acrylic derivatives as acrylonitrile or methacrylonitrile. The alkyl esters of acrylic acid and α-methacrylic acid which contain one to four carbon atoms in the alkyl group are of prime interest. Yet interesting new copolymers are also obtainable from other polymerizable compounds having a single terminal olefinic linkage and which normally yield thermoplastic polymers. These are made harder, more resistant to abrasion, and resistant to most organic solvents by copolymerization as shown above.

We claim:

1. A copolymer based on sixty to ninety parts by weight of an ester of the formula

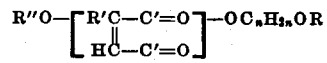

$$R''O-\left[\begin{array}{c}R'C-C'=O\\ \|\\ HC-C'=O\end{array}\right]-OC_nH_{2n}OR$$

wherein R is an allyl group, R' is a member of the class consisting of hydrogen, chlorine, bromine, and the methyl group, R'' is an alkyl group of not over eight carbon atoms, and $C_nH_{2n}$ is an alkylene radical of two to three carbon atoms, and forty to ten parts of a polymerizable monovinylidene compound which is miscible with said ester.

2. A copolymer based on sixty to ninety parts by weight of an ester of the formula $$CH_2=CHCH_2OCH_2CH_2OCOCH=CHCOOR''$$

wherein R'' is an alkyl group of not over eight carbon atoms, and forty to ten parts of a polymerizable monovinylidene compound which is miscible with said ester.

3. A copolymer based on sixty to ninety parts by weight of an ester of the formula $$CH_2=CHCH_2OCH_2CH_2OCOCH=CHCOOR''$$

wherein R'' is an alkyl group of not over eight carbon atoms, and forty to ten parts of an ester of α-methacrylic acid and a saturated monohydric aliphatic alcohol of not over four carbon atoms.

4. A copolymer based on sixty to ninety parts by weight of an ester of the formula $$CH_2=CHCH_2OCH_2CH_2OCOCH=CHCOOR''$$

wherein R'' is an alkyl group of not over eight carbon atoms, and forty to ten parts of an ester of acrylic acid and a saturated monohydric aliphatic alcohol of not over four carbon atoms.

5. A copolymer based on sixty to ninety parts by weight of an ester of the formula $$CH_2=CHCH_2OCH_2CH_2OCOCH=CHCOOR''$$

wherein R'' is an alkyl group of not over eight carbon atoms, and forty to ten parts of methyl α-methacrylate.

6. The copolymer of claim 5 wherein the alkyl group is the methyl group.

7. The copolymer based on 60 parts by weight of allyloxyethyl methyl maleate, 30 parts of methyl methacrylate, and 10 parts of ethyl acrylate.

8. A copolymer based on 60 to 90 parts by weight of allyloxyethyl methyl maleate and 40 to 10 parts of butyl methacrylate.

9. A copolymer based on 60 to 90 parts by weight of allyloxyethyl butyl maleate and 40 to 10 parts of methyl methacrylate.

HARRY T. NEHER.
EDWIN H. KROEKER.
WILLARD J. CROXALL.

REFERENCES CITED

The following references are of record in the file of this patent:

UNITED STATES PATENTS

| Number | Name | Date |
| --- | --- | --- |
| 2,047,398 | Voss et al. | July 14, 1936 |
| 2,273,891 | Pollack et al. | Feb. 24, 1942 |
| 2,430,109 | D'Alelio | Nov. 4, 1947 |
| 2,425,144 | Bruson et al. | Aug. 5, 1947 |
| 2,430,109 | D'Alelio | Nov. 4, 1947 |